Oct. 19, 1937.   C. P. DEIBEL   2,096,627

DRY CELL BATTERY UNIT

Filed April 10, 1936

INVENTOR.
Cyril P. Deibel
BY Hull, Brock & West
ATTORNEY.

Patented Oct. 19, 1937

2,096,627

UNITED STATES PATENT OFFICE 2,096,627

DRY CELL BATTERY UNIT

Cyril P. Deibel, Lakewood, Ohio

Application April 10, 1936, Serial No. 73,743

5 Claims. (Cl. 136—109)

This invention relates generally to dry cell battery units and more particularly to a battery unit which is generally known to the art as a C-battery, which has particular use in radio sets for placing a negative bias on the grids of the tubes.

Radio sets of different manufacturers are designed to have different voltages applied to the grids and batteries of this character are generally furnished with a universal plug-in socket or terminal connection by means of which different voltages may be taken from the unit. Heretofore it has been difficult to rigidly connect these universal plug-in connections to the battery unit in such a manner that they will not be easily dislodged or broken off. These C-battery units hereinbefore referred to usually consist of fifteen cells of one and one-half volts each arranged in a single unit and connected in series and sealed within a container.

My invention relates specifically to a battery unit of this character having a universal plug-in terminal connection which is rigidly secured to the cells by the terminal connections.

The main object of the invention is to provide a dry cell battery unit of the character described having a universal terminal connection which is firmly and rigidly secured to the unit in such a manner that it is not likely to become dislodged or disconnected from the unit.

Another object of the invention is to provide a dry cell battery unit of the character described having a universal terminal connection which is rigidly and permanently secured to the zinc cans which form a part of the battery unit and in which the terminal connections for tapping off different voltages provide the means for securing the terminal in place.

Another object of the invention is to provide a dry cell battery unit having a universal plug-in socket connection rigidly secured to the unit and in which the number of connections are greatly reduced and the chances of short circuit reduced to a minimum and in which there is no chance of error in connecting the unit with a radio set.

Figure 1:
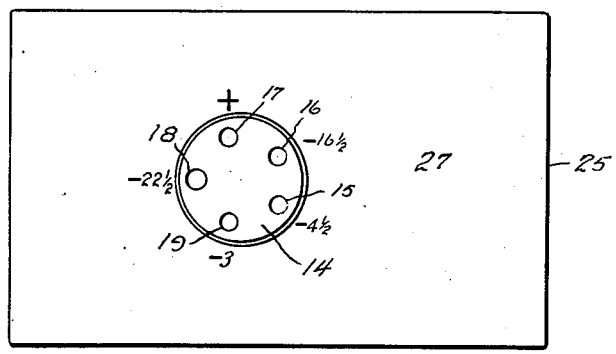
Figure 2:
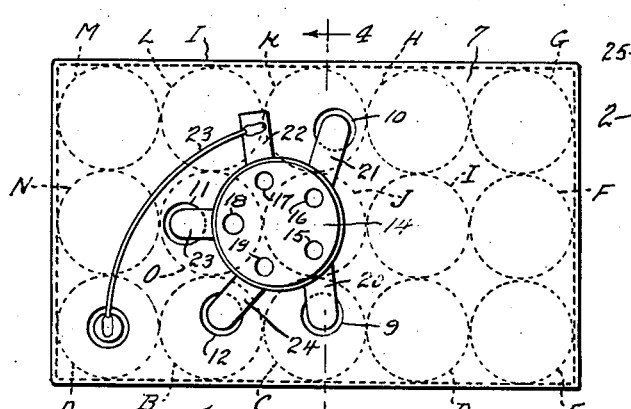
Figure 4:
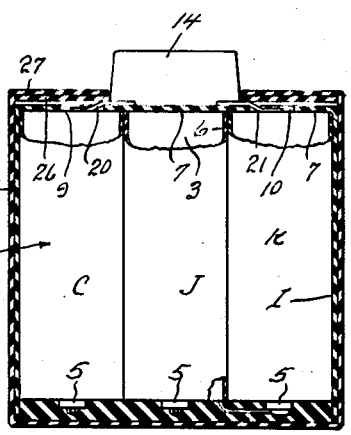
Figure 3:
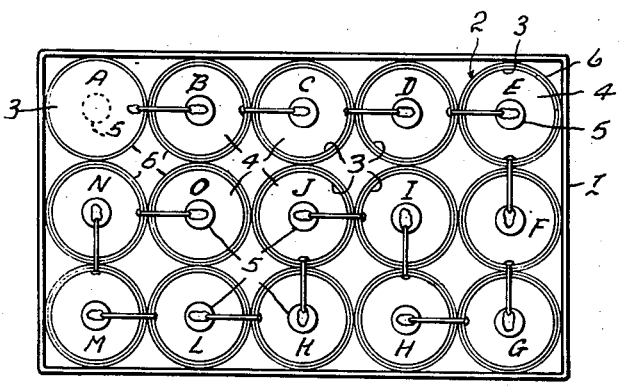

Further and more limited objects of the invention will appear as the description proceeds and by reference to the accompanying drawing in which Fig. 1 is a top plan view of a dry cell battery unit constructed in accordance with my invention; Fig. 2 is a top plan view of the inner carton which contains the cells; Fig. 3 is a bottom plan view of the inner carton showing the manner in which the cells are connected in series; and Fig. 4 is a vertical sectional view on the line 4—4 of Fig. 1.

Referring now to the drawing, my battery unit consists essentially of an inner carton or container 1 which is formed of paper or other suitable material and which is preferably rectangular in shape and in which are arranged a plurality of dry cells 2, each of which consists of a zinc can 3 in which is arranged a mass 4 of depolarizing mix and a carbon electrode 5. Each can is surrounded by a wrapper or carton 6 which insulates the cans one from the other. The carton 1 is open at its lower end and the cells are arranged therein as shown most clearly in Fig. 3 which is a bottom plan view of the inner container. It will be seen from an inspection of Figs. 3 and 4 that all of the zinc cans with the exception of one in the upper left hand corner are arranged in the carton in the inverted or upside down position.

The carton 1 is provided with a cover 7 which has therein several openings indicated by the reference characters 9, 10, 11, 12 and 13. Disposed exterior of the cover 7 and resting thereon is a universal plug-in socket connection 14 the construction of which is well known to those skilled in the art and which is circular in shape and provided with five openings indicated by the reference characters 15, 16, 17, 18 and 19. The opening 18 is slightly larger than the other openings, the purpose of which will hereinafter appear.

For convenience of description the several cells are identified by the reference characters A, B, C, D, E, F, G, H, I, J, K, L, M, N and O. All of the cells with the exception of cell A are arranged within the inner carton 1 in the inverted position, that is, with their bottoms uppermost; and cell A is arranged in the carton in the upright position, that is, with the bottom down and with the carbon electrode uppermost.

Leading from the plug-in socket connection 14 are a plurality of flat somewhat elongated metal tabs which are indicated by the reference characters 20, 21, 22, 23 and 24. Leading from the tab 22 is a wire 23 the opposite end of which is connected with the carbon electrode of cell A. The tab 21 is connected with the bottom of the zinc can K, the tab 20 is connected to the bottom of the zinc can C and the tab 24 is connected with the bottom of the zinc can B. It is of course understood that the universal socket 14 is adapted to receive therein a complementary plug having prongs which fit within the openings 15, 16, 17, 18 and 19. The opening 18 is somewhat larger than the remaining openings in the socket and the prongs which fit within these openings are of the same relative size. It will therefore be seen that the plug can be inserted into the socket in only one position, that is, with the largest prong in the opening 18 which properly positions all of the other connections.

The carton 1 with the universal plug-in connection applied thereto is placed within an outer carton 25 which is also formed of paper and has an inner flap 26 having a circular opening therein through which the terminal connection 14 projects and an outer flap 27 which also is provided with a circular opening through which the terminal connection 14 projects, as shown most clearly in Fig. 4. The flaps on the outer carton are preferably sealed in place by means of glue or other suitable adhesive. It will therefore be seen that my battery unit consists of a plurality of zinc cans arranged within a carton and connected in series and a universal plug-in socket for the unit which is secured to the bottoms of a plurality of the zinc cans by means of the connectors. Cell A is left in the upright position to facilitate connection of the connector 23 with the carbon electrode or positive terminal thereof.

It will now be clear that I have provided a battery unit having a universal plug-in connection which is rigidly and permanently secured to the bodies of a plurality of zinc cans and which is not likely to become dislodged or displaced. It will also be seen that the universal plug-in socket is located unequal distances from the ends of the container and that the openings in the flaps of the outer carton are so arranged that it will be impossible to close the outer carton unless the inner carton has been placed therein in the proper position. This is quite necessary in view of the fact that the outer carton has printed thereon suitable indicia indicating the different voltages which can be obtained.

It will now be clear that I have provided a dry cell battery unit of the character described which will accomplish the objects of the invention hereinbefore stated. It will of course be understood that the embodiment of the invention herein disclosed is to be considered merely illustrative and not in a limiting sense as various changes may be made in the details of construction and arrangement of parts without departing from the spirit of my invention as the invention is limited only in accordance with the scope of the appended claims.

Having thus described my invention, what I claim is:

1. A dry cell battery unit consisting of a plurality of cells arranged within a carton, each cell comprising a zinc can and a carbon electrode, and a universal plug-in socket rigidly connected with the bottoms of a plurality of said cans and also connected with the carbon electrode of one of said cells, all of said cans except one being arranged within said carton with the bottoms thereof uppermost.

2. A dry cell battery unit made up of a plurality of cells and including a plurality of zinc cans arranged within a carton in the inverted position, a universal plug-in socket for said unit, means rigidly connecting said socket with the bottoms of a plurality of said zinc cans, a connection between said socket and the positive terminal of one of said cells, said means comprising a plurality of connectors for obtaining different voltages, the cell connected with the positive terminal of said socket being disposed in the upright position to facilitate connection with said socket.

3. A dry cell battery unit consisting of a carton having a plurality of dry cells arranged therein and each cell consisting of a metal can in which is disposed a mass of mix and a carbon electrode, a universal plug-in socket secured over one wall of said carton and having a plurality of rigid tabs rigidly connected with the bottoms of a plurality of said cans and an additional connection connecting said socket with the carbon electrode of one of said cells, said tabs serving also as a means for obtaining different voltages from the battery unit.

4. A dry cell battery unit consisting of a carton having a plurality of dry cells arranged therein and each cell consisting of a metal can in which is disposed a mass of mix and a carbon electrode, a universal plug-in socket secured over one wall of said carton and having a plurality of rigid tabs rigidly connected with the bottoms of a plurality of said cans and an additional connection connecting said socket with the carbon electrode of one of said cells, said tabs serving also as a means for obtaining different voltages from the battery unit, the wall of said carton over which said socket is secured serving to insulate said socket from said cells and having a plurality of openings therein permitting said rigid tabs to be soldered to said cans.

5. A dry cell battery unit made up of a plurality of dry cells arranged within an inner carton in an inverted position, each cell consisting of a zinc can in which is disposed a mass of mix and a carbon electrode, a universal plug-in socket secured over the bottom wall of said carton and having a plurality of rigid tabs thereon rigidly connecting said socket with the bottoms of a plurality of said zinc cans, said socket having an additional tab connected with the carbon electrode of one of said cells, an outer carton enclosing said inner carton and having an opening therein through which said socket is accessible, said rigid tabs serving to hold said socket against movement with respect to said cans and as connectors for obtaining different voltages from said battery unit.

CYRIL P. DEIBEL.